(12) United States Patent
Allen

(10) Patent No.: US 11,584,517 B2
(45) Date of Patent: Feb. 21, 2023

(54) NOSE-WHEEL STEERING SYSTEM

(71) Applicant: GOODRICH CORPORATION, Charlotte, NC (US)

(72) Inventor: Jason Bradley Allen, Waco, TX (US)

(73) Assignee: Goodrich Corporation, Charlotte, NC (US)

( * ) Notice: Subject to any disclaimer, the term of this patent is extended or adjusted under 35 U.S.C. 154(b) by 73 days.

(21) Appl. No.: 17/195,404

(22) Filed: Mar. 8, 2021

(65) Prior Publication Data

US 2022/0281591 A1 Sep. 8, 2022

(51) Int. Cl.
*B64C 25/50* (2006.01)
*B64C 25/22* (2006.01)
*B64C 25/60* (2006.01)

(52) U.S. Cl.
CPC ............ *B64C 25/50* (2013.01); *B64C 25/22* (2013.01); *B64C 25/60* (2013.01)

(58) Field of Classification Search
CPC .......... B64C 25/22; B64C 25/50; B64C 25/60
See application file for complete search history.

(56) References Cited

U.S. PATENT DOCUMENTS

| 2,372,710 A | 4/1954 | Chisholm, Jr. | |
| 2,383,773 A | 8/1954 | Chisholm, Jr. | |
| 3,391,580 A * | 7/1968 | Stadler | B64C 25/505 91/375 R |
| 4,265,417 A * | 5/1981 | Watts | B64C 25/505 244/50 |
| 4,730,788 A * | 3/1988 | Metcalf | B64C 25/50 244/50 |
| 8,136,754 B2 * | 3/2012 | De Ruffray | B64C 25/50 244/50 |
| 8,267,350 B2 * | 9/2012 | Elliott | F16H 25/205 244/50 |
| 10,196,135 B2 * | 2/2019 | Quenerch'Du | F16H 19/04 |
| 2010/0038478 A1 | 2/2010 | Knight | |
| 2021/0214073 A1 * | 7/2021 | Acks | B64C 25/50 |

FOREIGN PATENT DOCUMENTS

| CN | 102923300 | 2/2013 |
| EP | 2778047 A2 | 9/2014 |
| GB | 2161123 | 1/1986 |
| WO | 2007000411 | 1/2007 |

OTHER PUBLICATIONS

European Patent Office, European Search Report dated Jul. 6, 2022 in Application No. 22160589.2.

* cited by examiner

*Primary Examiner* — Tye William Abell
(74) *Attorney, Agent, or Firm* — Snell & Wilmer L.L.P.

(57) ABSTRACT

A nose-wheel steering system may comprise an actuator and a bevel gear rotationally coupled to a drive shaft of the actuator. The bevel gear may be configured to rotate about a first axis. A collar gear may be intermeshed with the bevel gear. The collar gear may be configured to rotate about a second axis that is generally perpendicular to the first axis.

15 Claims, 6 Drawing Sheets

NOSE-WHEEL STEERING SYSTEM

FIELD

The present disclosure relates generally to aircraft steering systems and, more particularly, to aircraft nose-wheel steering systems.

BACKGROUND

Aircraft typically employ nose-wheel steering systems to steer the aircraft while taxiing on the ground. A typical nose-wheel steering system includes a collar gear provided upon a strut associated with the nose-wheel. Various actuators and gear trains may be associated with rotating the collar gear, and hence the strut, thereby adjusting the orientation of the nose-wheel to affect steering (i.e., the direction of the taxiing aircraft). Current actuator and gear train arrangements typically include a rack and pinion type mechanism that converts linear movement of a rack into to rotary movement. These arrangements are relatively large and, therefore, add weight and space claim to the landing gear and are not always easy to accommodate with other landing gear components. Further, these larger actuator and gear train arrangements may not be aesthetically pleasing.

SUMMARY

A nose-wheel steering system is disclosed herein. In accordance with various embodiments, the nose-wheel steering system may comprise an actuator including a drive shaft configured to rotate about a first axis. A bevel gear may be rotationally coupled to the drive shaft of the actuator. The bevel gear may be configured to rotate about the first axis. A collar gear may be intermeshed with the bevel gear. The collar gear may be configured to rotate about a second axis, generally perpendicular to the first axis.

In various embodiments, the actuator may include a single vane hydraulic rotary actuator. In various embodiments, the actuator may include a rotating vane and a stationary vane. The rotating vane may be rotationally coupled to the drive shaft.

In various embodiments, a first conduit may be fluidly coupled to a first hydraulic chamber of the actuator. A second conduit may be fluidly coupled to a second hydraulic chamber of the actuator. A control valve assembly may be coupled to the first conduit and the second conduit. The control valve assembly may be configured to control fluid flow to each of the first hydraulic chamber and the second hydraulic chamber.

In various embodiments, a steering controller may be operably coupled to the control valve assembly. The steering controller may be configured to control actuation of the control valve assembly.

In various embodiments, a gear train may be rotationally coupled between the drive shaft of the actuator and the bevel gear. In various embodiments, the gear train may include a planetary gear system.

In various embodiments, the drive shaft may form a sun gear of the planetary gear system.

A shock strut assembly for an aircraft landing gear assembly is also disclosed herein. In accordance with various embodiments, shock strut assembly may comprise a strut cylinder, a strut piston configured to telescope relative to the strut cylinder, and a steering system coupled to the strut piston and configured to rotate the strut piston about a piston axis of rotation. The steering system may comprise an actuator including a drive shaft configured to rotate about a second axis, a bevel gear rotationally coupled to the drive shaft of the actuator and configured to rotate about the second axis, and a collar gear intermeshed with the bevel gear and configured to rotate about the piston axis of rotation. The second axis may be non-parallel to the piston axis of rotation.

In various embodiments, the steering system may further comprise a gear train rotationally coupled between the drive shaft of the actuator and the bevel gear. In various embodiments, the gear train includes a planetary gear system. The planetary gear system may comprise a non-rotating ring gear, a planet gear configured to rotate about an inner circumferential surface of the non-rotating ring gear, and a carrier coupled to the planet gear and configured to rotate the bevel gear. Rotation of the planet gear may be driven by rotation of the drive shaft about the second axis.

In various embodiments, an outer circumferential surface of the carrier may define a toothed surface of the bevel gear. The toothed surface of the bevel gear may be intermeshed with the collar gear.

In various embodiments, the actuator may include a rotating vane and a stationary vane. The rotating vane may be rotationally coupled to the drive shaft.

In various embodiments, the steering system may further comprise a first conduit fluidly coupled to a first hydraulic chamber of the actuator, a second conduit fluidly coupled to a second hydraulic chamber of the actuator; and a control valve assembly coupled to the first conduit and the second conduit. The control valve assembly may be configured to control fluid flow to each of the first hydraulic chamber and the second hydraulic chamber. In various embodiments, the second axis may be generally perpendicular to the piston axis of rotation.

A nose landing gear assembly is also disclosed herein. In accordance with various embodiments, the nose landing gear assembly may comprise a shock strut assembly and a nose-wheel steering system coupled to the shock strut assembly. The shock strut assembly may include a strut cylinder and a strut piston configured to telescope relative to the strut cylinder. The nose-wheel steering assembly may be configured to rotate the strut piston about a piston axis of rotation. The nose-wheel steering system may comprise: an actuator including a drive shaft configured to rotate about a second axis, a bevel gear rotationally coupled to the drive shaft of the actuator and configured to rotate about the second axis, and a collar gear intermeshed with the bevel gear and configured to rotate about the piston axis of rotation. The second axis may be non-parallel to the piston axis of rotation.

In various embodiments, a nose wheel assembly may be coupled to the strut piston. An axis of rotation of the nose wheel assembly may be generally perpendicular to the piston axis of rotation.

In various embodiments, the actuator may include a rotating vane and a stationary vane. The rotating vane may be rotationally coupled to the drive shaft.

In various embodiments, a planetary gear system may be rotationally coupled between the drive shaft and the bevel gear. In various embodiments, the actuator may comprise a single vane hydraulic rotary actuator. The second axis may be generally perpendicular to the piston axis of rotation.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Figure 1:
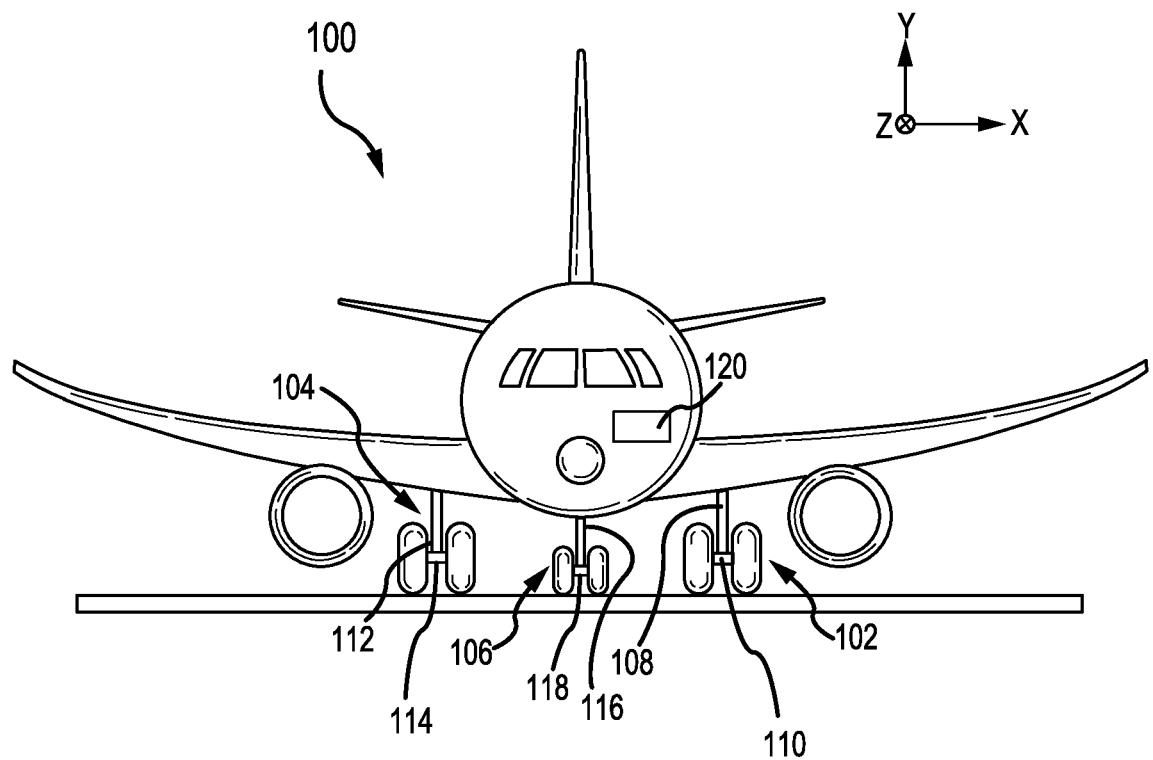
FIG. 1 illustrates an aircraft having left, right and nose landing gear assemblies and wheels mounted thereon, in accordance with various embodiments.

With reference to FIG. 1, an aircraft 100 is illustrated. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118. One or more pilot steering input(s) 120 (e.g., steering wheels, pedals, knobs, or the like) may be located in a cockpit of aircraft 100.

Figure 2:
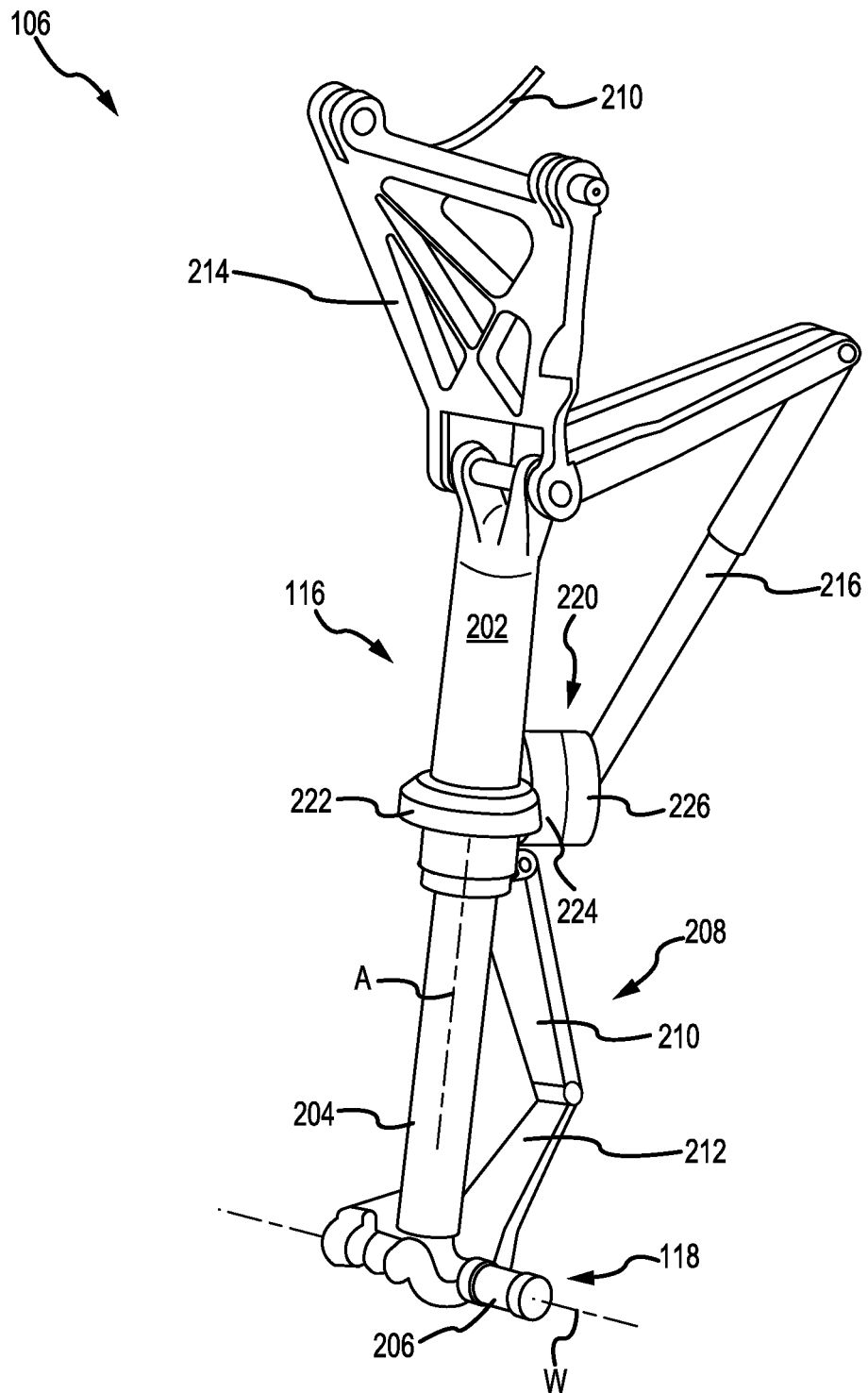
FIG. 2 illustrates a nose landing gear assembly, in accordance with various embodiments.

Referring now to FIG. 2, nose landing gear assembly 106 is illustrated. In accordance with various embodiments, shock strut assembly 116 of nose landing gear assembly 106 includes a strut cylinder 202 and a strut piston 204. Strut piston 204 may be operatively coupled to strut cylinder 202. Strut cylinder 202 may be configured to receive strut piston 204 in a manner that allows the two components to telescope with respect to one another. Strut piston 204 may translate into and out strut cylinder 202, thereby absorbing and damping loads imposed on nose landing gear assembly 106. An axle 206 of nose wheel assembly 118 may be coupled to an end of strut piston 204 that is opposite strut cylinder 202. The nose wheels have been removed from nose wheel assembly 118 in FIG. 2 to more clearly illustrate the features of shock strut assembly 116.

In various embodiments, nose landing gear assembly 106 may include a torque link 208 coupled to shock strut assembly 116 and/or to axle 206. Torque link 208 includes a first (or upper) arm 210 and a second (or lower) arm 212. First arm 210 is pivotably coupled to second arm 212. Strut cylinder 202 is coupled to an attachment linkage 214 configured to secure shock strut assembly 116 to the aircraft 100 and to translate nose landing gear assembly 106 between the landing gear up and landing gear down positions. Nose landing gear assembly 106 may include one or more drag brace(s) such as drag brace 216. In various embodiments, drag brace 216 may be located proximate an aft side of shock strut assembly 116. Nose landing gear assembly 106 may include one or more hydraulic fluid lines (i.e. conduits), such as hydraulic fluid line 210.

In accordance with various embodiments, nose landing gear assembly 106 includes a nose-wheel steering system 220. Nose-wheel steering system 220 is operably coupled to nose wheel assembly 118 via shock strut assembly 116. In this regard, and as described in further detail below, nose-wheel steering system 220 is configured to rotate strut piston 204 about a piston axis of rotation A (also reference to as "axis A"), thereby adjusting the orientation of the nose wheel assembly 118 and the taxiing direction of the aircraft 100. Axis of rotation A may be parallel to the direction of translation of strut piston 204 relative to strut cylinder 202. In various embodiments, axis of rotation A may be generally perpendicular to the axis of rotation W of nose wheel assembly 118. As used in the previous context only, "generally perpendicular" means ±10° from perpendicular.

Nose-wheel steering system 220 includes a steering collar housing 222, a gear assembly housing 224, and an actuator housing 226. In various embodiments, gear assembly housing 224 and actuator housing 226 may include a generally cylindrical shape. For example, a cross-section of gear assembly housing 224 and actuator housing 226, taken in a plane parallel to axis of rotation A, may be generally circular. While gear assembly housing 224 and actuator housing 226 are illustrated as located on an aft-side of steering collar housing 222, the size and/or shape of gear assembly housing 224 and actuator housing 226, along with the orientation of the rotating components located in steering collar housing 222, gear assembly housing 224, and actuator housing 226 (described in further detail below), allow gear assembly housing 224 and actuator housing 226 to be located in other locations about axis of rotation A. For example, gear assembly housing 224 and actuator housing 226 may be located on the forward-side, the port-side, or the starboard-side of steering collar housing 222. In this regard, a location of gear assembly housing 224 and actuator housing 226 may be selected based not only on available space, but also based on aesthetics.

Figure 3A:
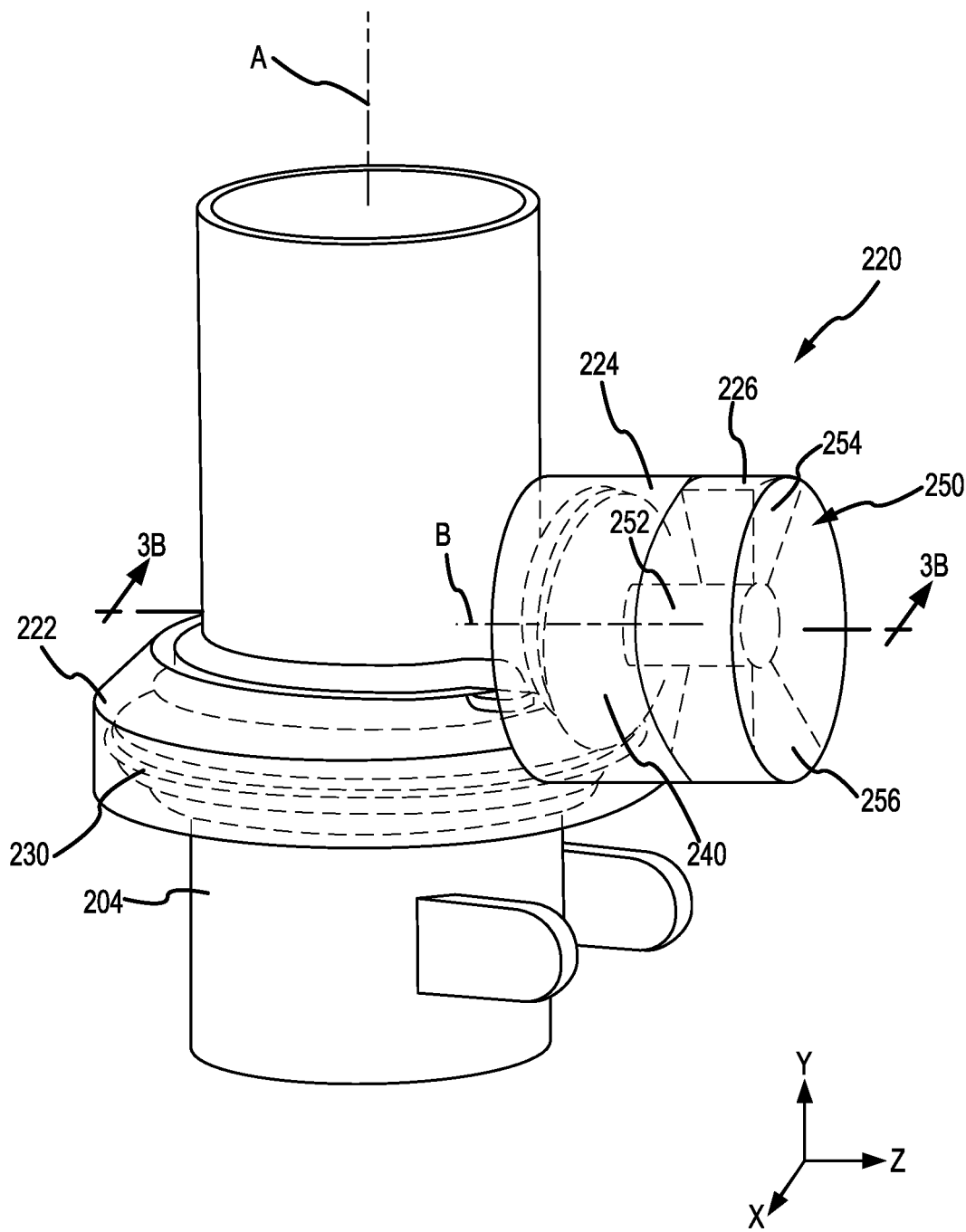
FIG. 3A and illustrates a nose-wheel steering system, in accordance with various embodiments.
Figure 3B:
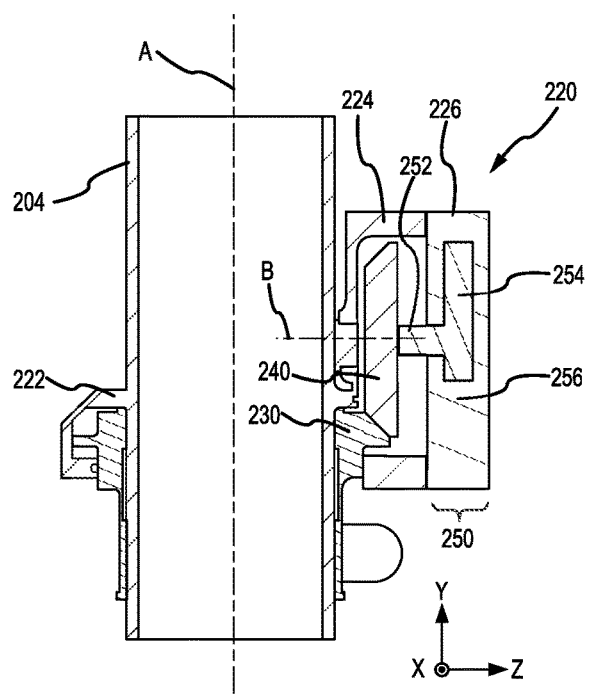
FIG. 3B illustrates a cross-section view of a nose-wheel steering system taken along the line 3B-3B in FIG. 3A, in accordance with various embodiments.

Referring now to FIG. 3A and FIG. 3B, a perspective view and a cross-section view, respectively, of nose-wheel steering system 220 are illustrated. The nose-wheel steering system 220 includes a collar gear 230. Collar rear may be located in steering collar housing 222. Collar gear 230 is coupled to strut piston 204 such that rotation of collar gear 230 about axis of rotation A is transferred to strut piston 204. In this regard, rotation of collar gear 230 about axis of rotation A causes rotation of strut piston 204 about axis of rotation A.

Nose-wheel steering system 220 further includes a bevel gear 240. Bevel gear may be located in gear assembly housing 224. Bevel gear 240 engages (i.e. is intermeshed with) collar gear 230. Bevel gear 240 rotates about a bevel gear axis of rotation B (also referred to as "axis B"). Axis of rotation B is non-parallel to axis of rotation A. In various embodiments, axis of rotation B is generally perpendicular to axis of rotation A of collar gear 230. As used in the previous context only, "generally perpendicular" means±5°.

Bevel gear 240 is operably coupled to an actuator 250. Actuator 250 is configured to drive rotation of bevel gear 240 about axis of rotation B. In accordance with various embodiments, actuator 250 includes a drive shaft 252 rotationally coupled to bevel gear 240. In this regard, rotation of drive shaft 252 about axis of rotation B drives rotation of bevel gear 240 about axis of rotation B, which in turn drives rotation of collar gear 230 about axis of rotation A.

In various embodiments, actuator 250 comprises a single vane hydraulic rotary actuator. In this regard, and with additional reference to FIG. 4A, actuator 250 includes a rotating vane 254 and a stationary vane 256. Stationary vane 256 is attached to, and/or may be integral with, actuator housing 226. Rotating vane 254 rotates relative to stationary vane 256 and about axis of rotation B. Drive shaft 252 is coupled to, and/or may be integral with, rotating vane 254. In this regard, rotation of rotating vane 254 drives rotation of drive shaft 252.

In accordance with various embodiments, rotation of rotating vane 254 is controlled via hydraulic pressure. In various embodiments, actuator 250 includes a first hydraulic chamber 260 and a second hydraulic chamber 262. First hydraulic chamber 260 is defined, at least partially, by an inner circumferential surface 258a of actuator housing 226, a first radially extending surface 254a of rotating vane 254, and a first radially extending surface 256a of stationary vane 256. Second hydraulic chamber 262 is defined, at least partially, by inner circumferential surface 258a of vane housing 258, a second radially extending surface 254b of rotating vane 254, and a second radially extending surface 256b of stationary vane 256. First radially extending surface 254a of rotating vane 254 is opposite (i.e., oriented away from) second radially extending surface 254b of rotating vane 254. First radially extending surface 256a of stationary vane 256 is opposite (i.e., oriented away from) second radially extending surface 256b of stationary vane 256.

First hydraulic chamber 260 is fluidly connected to a first conduit 264. Second hydraulic chamber 262 is fluidly connected to a second conduit 266. A control valve assembly 270 is operably connected to first and second conduits 264, 266. Control valve assembly 270 is configured to control the flow of hydraulic fluid to and from each of first hydraulic chamber 260 and second hydraulic chamber 262. Control valve assembly 270 may include a servo valve, one or more solenoid valve(s), or any valve or combination of valves suitable for controlling the flow volume and direction of flow to and from first chamber 260 and second hydraulic chamber 262. Control valve assembly 270 is operably coupled to a steering controller 272. Actuation of control valve assembly 270 may be controlled via steering controller 272. Stated differently, steering controller 272 is configured to control the opening and closing (i.e., actuation) of control valve assembly 270, thereby controlling the flow of hydraulic fluid to and from each of first hydraulic chamber 260 and second hydraulic chamber 262. Steering controller 272 is operably coupled to pilot steering input 120. Steering controller 272 may send actuation commands to control valve assembly 270 based on signals received from pilot steering input 120.

Figure 4A:
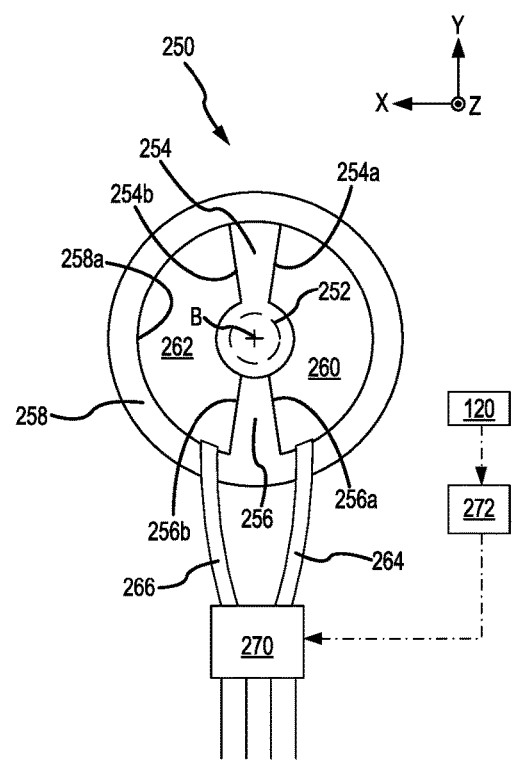
FIGS. 4A, 4B, and 4C illustrate a single vane hydraulic rotary actuator for a nose-wheel steering system, in accordance with various embodiments.
Figure 4B:
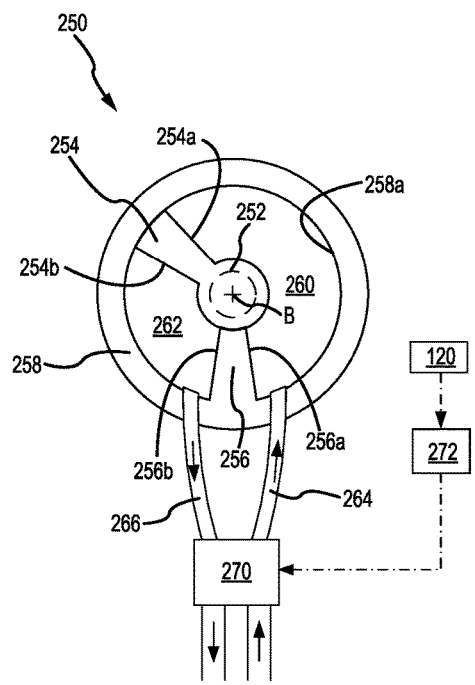

In operation, and with additional reference to FIG. 4B, first hydraulic chamber 260 is pressurized with hydraulic fluid, which forces rotating vane 254 to rotate in a first circumferential direction (e.g., counterclockwise) away from first radially extending surface 256a and toward second radially extending surface 256b of stationary vane 256. Rotation of rotating vane 254 drives rotation of drive shaft 252, which in turn drives rotation of bevel gear 240 in the first circumferential direction. Rotation of the bevel gear 240, which has gear teeth configured to engage gear teeth on collar gear 230, causes the collar gear 230 to rotate in a first direction (e.g., a counterclockwise direction) with respect to the axis of rotation A. Rotation of the collar gear 230 in the first direction causes strut piston 204 to likewise rotate in the first direction, thereby enabling the aircraft 100 to turn, for example toward its left (or port-side).

Figure 4C:
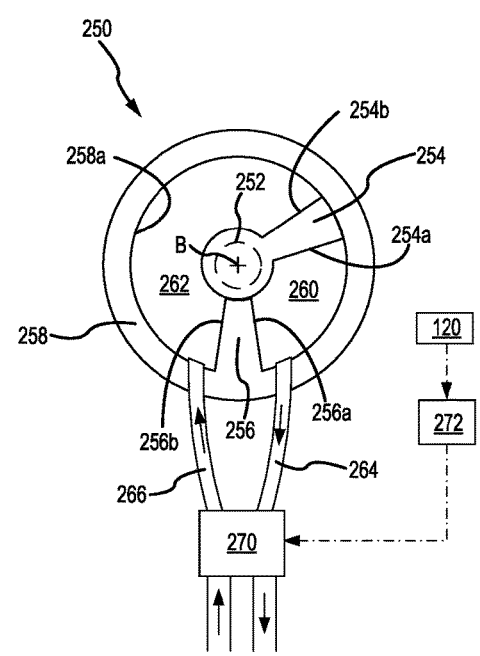

With additional reference to FIG. 4C, the process is reversed to enable turning the aircraft 100 to the right (or starboard-side). That is, the first hydraulic chamber 260 is depressurized while the second hydraulic chamber 262 is pressurized with hydraulic fluid, which forces rotating vane 254 to rotate in a second circumferential direction (e.g., clockwise) away from second radially extending surface 256b and toward first radially extending surface 256a of stationary vane 256, thereby causing drive shaft 252 and bevel gear 240 to rotate in the second circumferential direction about axis of rotation B, which in turn causes collar gear 230 to rotate in a second direction that is opposite the first direction about axis of rotation A.

Employing a single vane actuator tends to reduce the torque associated with the actuator. For example, collar gear 230 may be associated with a rotation of ±90° about axis A. Rotating vane 254 may be associated with a rotation of between ±90° and ±170° about axis B, between ±100° and ±160° about axis B, and/or between ±120° and between ±150° about axis A. The greater the difference between the number of degrees rotating vane 254 may rotate to produce 90 degrees of rotation in collar gear 230 decreases the torque requirement of actuator 250. A decreased torque requirement allows for smaller and lighter actuators.

Figure 5:
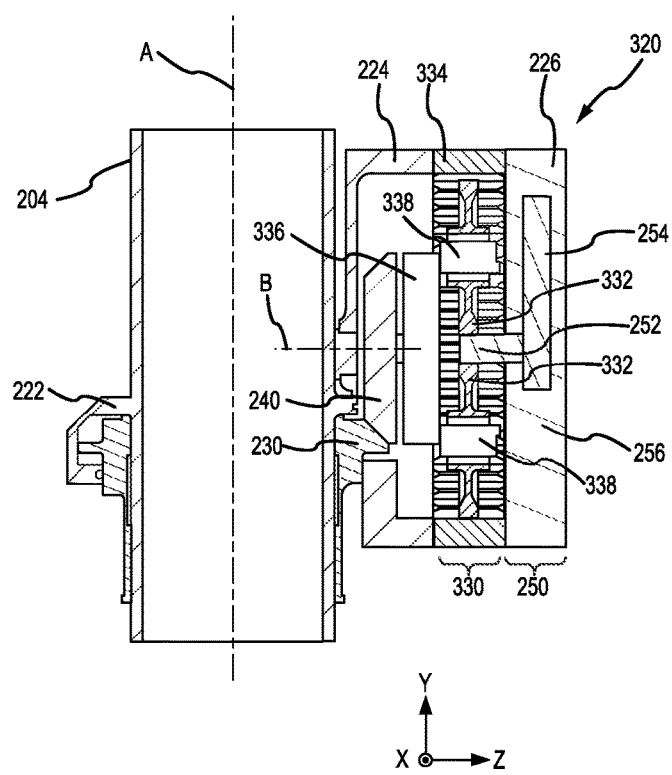
FIG. 5 illustrates a cross-section view of a nose-wheel steering system having a planetary gear system operably coupled between a hydraulic rotary actuator and a bevel gear, in accordance with various embodiments.

Referring now to FIG. 5, a nose-wheel steering system 320, similar to the nose-wheel steering system 220 described above with reference to FIGS. 3A and 3B, is illustrated. In accordance with various embodiments, nose-wheel steering system 320 includes a gear train 330 operably coupled between drive shaft 252 of actuator 250 and bevel gear 240.

In various embodiments, gear train 330 is a planetary (or epicyclic) gear system with drive shaft 252 forming the sun gear (or input gear) of the planetary gear system. For example, gear train 330 may include one or more planet gear(s) 332 engaged (i.e., intermeshed) with drive shaft 252 and with a ring gear 334 of gear train 330.

Ring gear 334 of gear train 330 is configured to be a stationary, non-rotating component. Ring gear 334 may be coupled to, or otherwise supported by, gear assembly housing 224 and/or actuator housing 226. Each planet gear 322 is coupled to a carrier 336 of gear train 330 via a pin 338. In various embodiments, a bearing may be located between the planet gear 332 and the pin 338. Pins 338 are configured to rotationally couple planet gears 332 to carrier 336 such that the torque generated by rotation of planet gears 322 about an inner circumference of ring gear 334 is transferred to carrier 336. Carrier 336 is rotationally coupled to bevel gear 240 such that rotation of carrier 336 is transferred to bevel gear 240. In various embodiments, bevel gear 240 may be integral with 336, such that a sloped outer circumferential surface of carrier 336 defines the gear teeth of bevel gear 240.

In operation, and with combined reference to FIG. 4B and FIG. 5, first hydraulic chamber 260 is pressurized with hydraulic fluid, which forces rotating vane 254 to rotate in the first circumferential direction (e.g., counterclockwise) away from first radially extending surface 256a and toward second radially extending surface 256b of stationary vane 256. Rotation of rotating vane 254 drives rotation of drive shaft 252, which in turn drives rotation of planet gears 332, which drives rotation of carrier 336 and bevel gear 240 above axis of rotation B. Rotation of bevel gear 240, which has gear teeth configured to engage gear teeth on collar gear 230, causes the collar gear 230 to rotate in a first direction (e.g., a counterclockwise direction) with respect to the axis of rotation A. Rotation of the collar gear 230 in the first direction causes strut piston 204 to likewise rotate in the first direction, thereby enabling the aircraft 100 to turn, for example toward its left (or port-side).

With combined reference to FIG. 4C and FIG. 5, the process is reversed to enable turning the aircraft 100 to the right (or starboard-side). That is, the first hydraulic chamber 260 is depressurized while the second hydraulic chamber 262 is pressurized with hydraulic fluid, which forces rotating vane 254 to rotate in a second circumferential direction (e.g., clockwise) away from second radially extending surface 256b and toward first radially extending surface 256a of stationary vane 256, thereby causing drive shaft 252, planet gears 322, carrier 336, and bevel gear 240 to rotate in the second circumferential direction about axis of rotation B, which in turn causes collar gear 230 to rotate in a second direction opposite direction about axis of rotation A.

Coupling gear train 330 between bevel gear 240 and actuator 250 may further decrease the torque associated with actuator 250 rotating strut piston 204 about axis A. Decreasing the torque reequipment of actuator 250 allows for smaller and lighter actuators.

Figure 6:
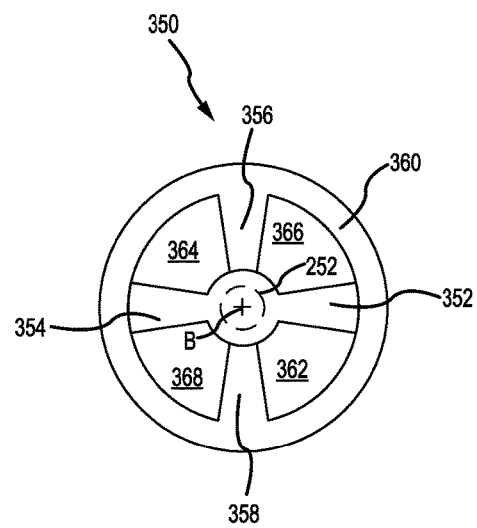
FIG. 6 illustrates a dual vane hydraulic rotary actuator of a nose-wheel steering system, in accordance with various embodiments.

While actuator 250 is illustrated as a single vane hydraulic rotary actuator, in various embodiments, nose-wheel steering system 220 in FIGS. 3A and 3B or nose-wheel steering system 320 in FIG. 5 may include a dual vane hydraulic rotary actuator 350 as illustrated in FIG. 6 in place of actuator 250. Dual vane hydraulic rotary actuator 350 includes a first rotating vane 352, a second rotating vane 354, a first stationary vane 356, and a second stationary vane 358. First and second stationary vanes 356, 358 are coupled to, and may be integral with, an actuator housing 360 of dual vane hydraulic rotary actuator 350. First and second rotating vanes 352, 354 are rotationally coupled to drive shaft 252. In this regard, rotation of First and second rotating vanes 352, 354 drives rotation of drive shaft 252 about axis of rotation B. A dual vane hydraulic rotary actuator generates approximately double the torque output relative to a single vane hydraulic rotary actuator, assuming pressure and area are constant. However, the range of rotation (e.g., the maximum angular rotation) of a dual vane hydraulic rotary actuator is approximately half the range of rotation of the single vane hydraulic rotary actuator. For example, a single vane hydraulic rotary actuator may have a ±150° range of rotation, while a dual vane hydraulic rotary actuator may have a ±75° range of rotation. In this regard, a dual vane actuator may tend to be used more often in steering systems that are associated with a smaller rotation range of the nose wheel assembly 118 (e.g., steering systems that are associated with less than or equal to approximately ±75° of rotation).

Rotation of first and second rotating vanes 352, 354 is controlled via hydraulic pressure in manner similar to rotating vane 254 in FIG. 4A. In this regard, a first hydraulic chamber 362 and a second hydraulic chamber 364 are pressurized with hydraulic fluid, which forces first and second rotating vanes 352, 354 to rotate in the first circumferential direction (e.g., counterclockwise), thereby enabling the aircraft 100 to turn in a first direction (e.g., to the left or port-side). The process is reversed to enable the aircraft 100 to turn in a second opposite direction (i.e., to the right or starboard-side). That is, the first hydraulic chamber 362 and second hydraulic chamber 364 are depressurized while a third hydraulic chamber 366 and a fourth hydraulic chamber 368 are pressurized with hydraulic fluid, which forces first and second rotating vanes 352, 354 to rotate in the second circumferential direction (e.g., clockwise).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A nose-wheel steering system, comprising:
    an actuator including a drive shaft configured to rotate about a first axis, wherein the actuator includes a rotating vane and a stationary vane, and wherein the rotating vane is rotationally coupled to the drive shaft;
    a bevel gear rotationally coupled to the drive shaft of the actuator and configured to rotate about the first axis;
    a planetary gear system rotationally coupled between the drive shaft and the bevel gear; and
    a collar gear intermeshed with the bevel gear and configured to rotate about a second axis, the second axis being generally perpendicular to the first axis.

2. The nose-wheel steering system of claim 1, further comprising:
    a first conduit fluidly coupled to a first hydraulic chamber of the actuator;
    a second conduit fluidly coupled to a second hydraulic chamber of the actuator; and
    a control valve assembly coupled to the first conduit and the second conduit, the control valve assembly being configured to control fluid flow to each of the first hydraulic chamber and the second hydraulic chamber.

3. The nose-wheel steering system of claim 2, further comprising a steering controller operably coupled to the control valve assembly, wherein the steering controller is configured to control actuation of the control valve assembly.

4. The nose-wheel steering system of claim 1, further comprising a gear train rotationally coupled between the drive shaft of the actuator and the bevel gear.

5. The nose-wheel steering system of claim 4, wherein the gear train includes the planetary gear system.

6. The nose-wheel steering system of claim 5, wherein the drive shaft forms a sun gear of the planetary gear system.

7. A shock strut assembly for an aircraft landing gear assembly, comprising:
    a strut cylinder;
    a strut piston configured to telescope relative to the strut cylinder; and
    a steering system coupled to the strut piston and configured to rotate the strut piston about a piston axis of rotation, the steering system comprising:
    an actuator including a drive shaft configured to rotate about a second axis, the second axis being non-parallel to the piston axis of rotation, wherein the actuator includes a rotating vane and a stationary vane, and wherein the rotating vane is rotationally coupled to the drive shaft;
    a bevel gear rotationally coupled to the drive shaft of the actuator and configured to rotate about the second axis;
    a planetary gear system rotationally coupled between the drive shaft and the bevel gear; and
    a collar gear intermeshed with the bevel gear and configured to rotate about the piston axis of rotation.

8. The shock strut assembly of claim 7, wherein the steering system further comprises a gear train rotationally coupled between the drive shaft of the actuator and the bevel gear.

9. The shock strut assembly of claim 8, wherein the gear train includes the planetary gear system, the planetary gear system comprising:
    a non-rotating ring gear;

a planet gear configured to rotate about an inner circumferential surface of the non-rotating ring gear, wherein rotation of the planet gear is driven by rotation of the drive shaft about the second axis; and a carrier coupled to the planet gear and configured to rotate the bevel gear.

10. The shock strut assembly of claim 9, wherein an outer circumferential surface of the carrier defines a toothed surface of the bevel gear, the toothed surface of the bevel gear being intermeshed with the collar gear.

11. The shock strut assembly of claim 10, wherein the steering system further comprises:

a first conduit fluidly coupled to a first hydraulic chamber of the actuator;

a second conduit fluidly coupled to a second hydraulic chamber of the actuator; and a control valve assembly coupled to the first conduit and the second conduit, the control valve assembly being configured to control fluid flow to each of the first hydraulic chamber and the second hydraulic chamber.

12. The shock strut assembly of claim 11, wherein the second axis is generally perpendicular to the piston axis of rotation.

13. A nose landing gear assembly, comprising:

a shock strut assembly including a strut cylinder and a strut piston configured to telescope relative to the strut cylinder; and a nose-wheel steering system coupled to the shock strut assembly and configured to rotate the strut piston about a piston axis of rotation, the nose-wheel steering system comprising:

an actuator including a drive shaft configured to rotate about a second axis, the second axis being non-parallel to the piston axis of rotation, wherein the actuator includes a rotating vane and a stationary vane, and wherein the rotating vane is rotationally coupled to the drive shaft;

a bevel gear rotationally coupled to the drive shaft of the actuator and configured to rotate about the second axis;

a planetary gear system rotationally coupled between the drive shaft and the bevel gear; and a collar gear intermeshed with the bevel gear and configured to rotate about the piston axis of rotation.

14. The nose landing gear assembly of claim 13, further comprising a nose wheel assembly coupled to the strut piston, wherein an axis of rotation of the nose wheel assembly is generally perpendicular to the piston axis of rotation.

15. The nose landing gear assembly of claim 13, wherein the second axis is generally perpendicular to the piston axis of rotation.

* * * * *